July 9, 1946.   W. E. BERKEY ET AL   2,403,629
IGNITION SYSTEM
Filed July 29, 1944
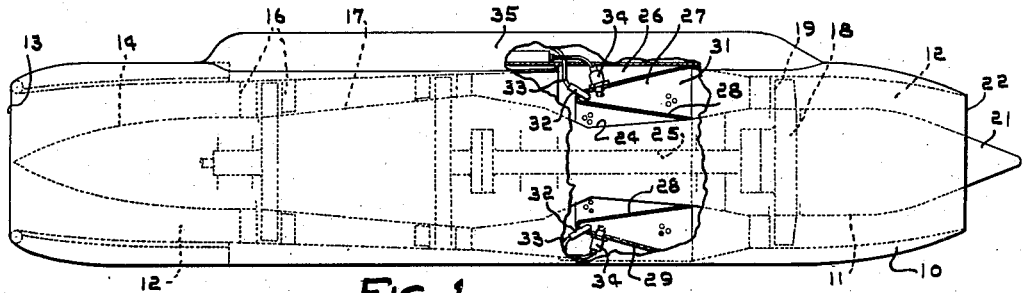
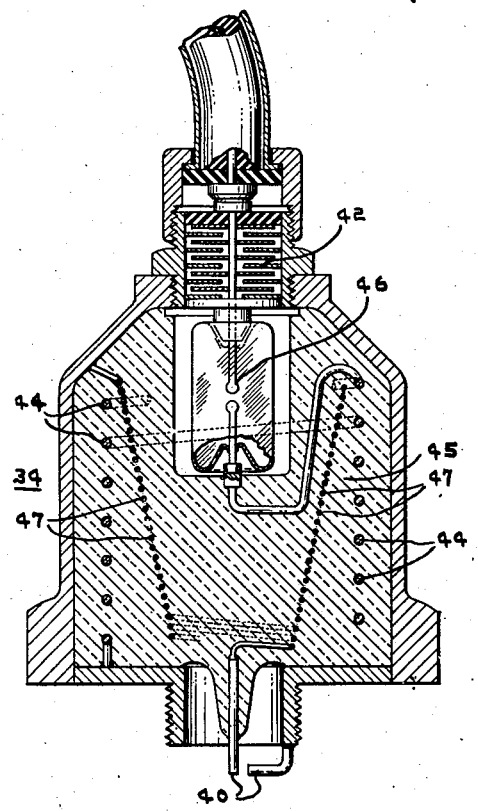
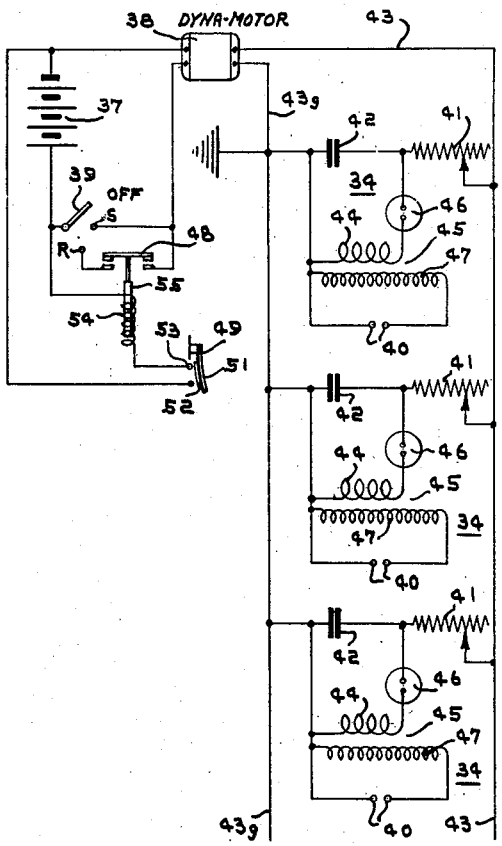
WITNESSES:
INVENTORS
WILLIAM E. BERKEY, ALBERT E. HERSHEY
AND   RICHARD  LAMPHERE.
BY
ATTORNEY Patented July 9, 1946

2,403,629

UNITED STATES PATENT OFFICE 2,403,629

IGNITION SYSTEM

William E. Berkey, Wilkinsburg, and Albert E. Hershey, Pittsburgh, Pa., and Richard Lamphere, Wilbraham, Mass., assignors to Westinghouse Electric Corporation, East Pittsburgh, Pa., a corporation of Pennsylvania Application July 29, 1944, Serial No. 547,260

2 Claims. (Cl. 123—148)

This invention relates to gas turbine power plants and particularly to an improved ignition system therefor, and it has for an object to provide an improved system of the character set forth.

The present invention, while not limited thereto, is particularly adapted to be used with a gas turbine power plant like that disclosed in the copending application of Stewart Way, Serial No. 482,533, filed April 10, 1943, and assigned to the assignee of the present invention. A power plant of the type disclosed in the mentioned Way application includes an axial flow air compressor, a combustion apparatus, a gas turbine and a propulsion jet nozzle all housed in line within a streamlined tubular casing. A plant of this character is particularly suitable for propelling aircraft at high speeds and operates generally as follows: Air enters the forward end of the tubular casing, which is pointed in the direction of flight, and is compressed in the compressor, the compressed air is then heated in the combustion apparatus by the combustion of fuel supported by the compressed air. The resulting motive fluid comprising the products of combustion and the excess compressed air drives the turbine and is then discharged through the propulsion nozzle as a jet, the reaction of which serves to propel the aircraft. The turbine extracts at least sufficient power from the motive fluid to drive the compressor and auxiliaries.

The present invention is concerned primarily with the ignition means which ignites the air and fuel mixture within the combustion apparatus and is generally in operation only when the plant is started since combustion of the air-fuel mixture is intended to be continuous thereafter.

Ignition of the air-fuel mixture is usually obtained by means of a spark gap and since accurate timing of the electrical impulses is unnecessary, all that is required is that a spark occur at reasonably frequent but not necessarily regular intervals.

It is an object of the present invention to provide an improved ignition system which is light weight, compact and obviates the need for a mechanical timer.

These and other objects are effected by the invention as will be apparent from the following description and claims taken in connection with the accompanying drawing, forming a part of this application, in which:

Fig. 1 is a side elevational view of a gas turbine power plant in which the present invention has been incorporated, a portion of the outer casing structure being broken away for the sake of clarity;

Fig. 2 is an enlarged sectional view of a spark plug employed in the present invention;

Fig. 3 is a schematic wiring diagram of the ignition system employed in the power plant shown in Fig. 1.

The power plant shown in Fig. 1 comprises an outer tubular casing 10, open from end to end and having a central core structure 11 providing an annular flow passage 12 which, if the plant is to be used for propelling an airplane is adapted to extend fore and aft with respect to the airplane with the left or inlet end 13, as viewed in Fig. 1, pointing in the direction of flight. The central core structure 11 is supported by the outer casing structure along its longitudinal axis and includes a hollow fairing cone 14 defining with the casing, an air inlet 13. The fairing cone 14 may house fuel and lubricating pumps and other auxiliaries (not shown) and is preferably supported from the casing 10 by compressor guide vanes 16.

The core 11 also includes the rotor of a compressor 17, a rotor 18 of a gas turbine, generally indicated 19, and a longitudinally adjustable conical tailpiece 21 which defines with the rear end of the casing 10 an adjustable propulsion nozzle 22.

The intermediate portion of the core structure between the compressor 17 and the turbine 19 comprises an inner tubular wall structure 24 which houses a shaft 25 connecting the turbine rotor 18 and the rotor of compressor 17. The inner wall structure 24 defines with the casing 10 an annular chamber 26 connecting the compressor blade passage and the turbine blade passage.

The chamber 26 is provided with a suitable combustion apparatus 27, such as shown in the copending application of Way, et. al., Serial No. 511,468, filed on November 23, 1943, and assigned to the assignee of the present invention, for heating the air compressed by the compressor to provide motive fluid for driving the turbine. The combustion apparatus 27 comprises inner and outer perforated conical wall members 28 and 29, respectively, defining an annular combustion space 31 of tapered cross section. Fuel is supplied to the combustion space 31 by means of circumferentially spaced atomizing nozzles 32 connected by means of pipes 33 to a source of fuel under pressure. The fuel mixes with the compressed air flowing through the perforated walls 28 and 29 in the combustion space 31 and is ignited by spark plugs 34.

When starting the power plant, the spark plugs 34 are intermittently energized, as will appear hereinafter, until the air-fuel mixture burns steadily and thereafter may remain deenergized. Any desired number of fuel nozzles 32 and spark plugs 34 may be employed although it is preferred to provide a sufficient number of plugs to insure prompt ignition of the air-fuel mixture and a sufficient number of nozzles to insure even burning throughout the combustion space 31.

The present invention is not concerned with the specific design of the apparatus thus far referred to or to the specific location of the fuel nozzles or the spark plugs but is directed particularly to the ignition system in which the spark plugs are incorporated. The ignition system, apart from that embodied in the plugs 34, may be conveniently housed within a tunnel 35 provided on the casing structure 10.

Referring to Fig. 3, which shows the ignition system for the plant of Fig. 1 schematically, a source of power 37 which may comprise a battery, a generator or the like, is connected to a dynamotor 38 or other suitable means for raising the voltage of the electricity supplied by the battery 37. The entire ignition system may be controlled by a three-position switch 39 located for convenient manipulation by the operator of the plant. The output of the dynamotor, which is preferably 2 to 3 kilovolts of direct current, is fed to points 40 of each of the spark plugs in the following manner: A resistance 41 and a condenser 42 are connected in series across load conductors 43 and 43g of the dynamotor 38. Primary winding 44 of a high frequency transformer 45 is connected in series with an enclosed spark gap 46 and in parallel with the condenser 42 while secondary 47 of the transformer 45 is connected across the points 40 of the spark plug.

The operation of the system is substantially as follows: Upon moving the switch 39 from its "off" position to its starting position S, the dynamotor 38 is energized and current flows through one load conductor 43, resistance 41 to one side of the condenser 42, the other side of the condenser being connected to the other load conductor 43g, which may be the metal structure common to all plug circuits. The resistance 41 limits the charging current flowing from the source 38 to the condenser 42, thereby defining the time required for the condenser 42 to build up to the breakdown voltage of the sealed gap 46. In this way a number of plug circuits may be charged in parallel from low power source 38 without appreciable voltage dips in this supply voltage. When the potential across the condenser 42 reaches the breakdown voltage of the gap 46, which may be in the order of 1½ to 2½ kilovolts, the condenser releases its energy in a surge or oscillatory, high frequency discharge through the primary 44 of the transformer 45. This surge voltage is mutiplied in the secondary 47, breaking down the gap between the spark plug points 40 to fire the plug. This high frequency operation of the spark plug is important in that reliable firing is obtained with fouled plugs with this circuit under conditions where customary ignition circuits will fail to fire.

From the above it will be seen that the intervals at which the plug fires may be determined by selecting a resistance 41 of a certain value. Under some operating conditions it may be desirable to fire the plugs at reduced speeds during normal engine operation. In this case the resistance 41 may be made variable as shown in Fig. 3, thereby avoiding excessive electrode wear.

The circuits for each of the plugs 34 is identical so that they are fired in parallel at rates determined by their resistance 41. It will be apparent that the plugs will fire at substantially regular intervals although no exact timing is sought since this is unnecessary in igniting the mixture in the combustion chamber of a gas turbine such as disclosed herein.

Referring to Fig. 2 it will be noted that the condenser 42, enclosed spark gap 46 and transformer windings 44 and 47 may be built into the spark plug proper, as described in the copending application, Serial No. 434,030, filed March 10, 1942, by W. E. Berkey and R. Lamphere, and assigned to the assignee of the present invention.

When the air-fuel mixture is burning steadily it may be no longer necessary to operate the ignition system and the switch 39 may be moved to its running position R. With the switch 39 in position R, should combustion accidentally cease, the ignition system again becomes operative automatically under the control of a normally open solenoid-actuated switch 48 connected in series with switch 39. The solenoid of switch 48 is energized to close its switch in response to a decrease in temperature of the motive fluid issuing from the combustion apparatus by means of a thermostatic switch 49. To this end the switch 49 may be located in or downstream of the combustion apparatus. The thermostatic switch 49 comprises a strip of bimetal 51 having a contact 52 thereon for bridging fixed contacts 53 in the solenoid circuit.

The thermostaic switch 49 is arranged to close and bridge contacts 53 when the temperature of the motive fluid falls below a predetermined value indicating that combustion in the combustion chamber has stopped. Closing of the thermostatic switch completes a circuit from one side of the power supply 37 through the closed contacts 53 and winding 54 of the solenoid to the other side of the power supply 37. Upon energization of the solenoid, its armature 55 is retracted and closes the switch 48 so that the spark plugs are again intermittently fired in the manner described above. When combustion is restored the thermostatic switch 49 again opens, deenergizing the solenoid switch 48 and restoring it to its open position to interrupt the ignition circuit.

While the invention has been shown in but one form, it will be obvious to those skilled in the art that it is not so limited, but is susceptible of various changes and modifications without departing from the spirit thereof, and it is desired, therefore, that only such limitations shall be placed thereupon as are specifically set forth in the appended claims.

What is claimed is:

1. An ignition system for the combustion apparatus of a gas turbine power plant or the like comprising a first circuit connectible to a source of electricity and including a resistance and condenser connected in series, said resistance serving to determine the rate of voltage rise across said condenser, a second circuit connected across said condenser and including the primary winding of a step-up transformer and a spark gap connected in series therewith, said spark gap being adapted to break down at a voltage less than that impressed on said first circuit, and a third circuit including the secondary winding of the step-up transformer connected across the points of a spark plug adapted to be disposed in said combustion apparatus for ignition of fuel therein.

2. An ignition system as set forth in claim 1 wherein said resistance is of the variable type to permit selection of the rate of voltage rise across said condenser.

WILLIAM E. BERKEY.
ALBERT E. HERSHEY.
RICHARD LAMPHERE.